(12) United States Patent
Harris

(10) Patent No.: US 7,286,860 B2
(45) Date of Patent: Oct. 23, 2007

(54) SYSTEMS AND METHODS FOR A COMFORTABLE WIRELESS COMMUNICATION DEVICE

(75) Inventor: Arlene J. Harris, Del Mar, CA (US)

(73) Assignee: Dyna LLC, Del Mar, CA (US)

( * ) Notice: Subject to any disclaimer, the term of this patent is extended or adjusted under 35 U.S.C. 154(b) by 0 days.

(21) Appl. No.: 10/898,419

(22) Filed: Jul. 23, 2004

(65) Prior Publication Data

US 2006/0019729 A1    Jan. 26, 2006

(51) Int. Cl.
*H04M 1/00* (2006.01)
(52) U.S. Cl. ............... 455/575.2; 455/575.1; 455/575.6; 455/575.3; 455/90.1; 455/90.2; 455/90.3; 381/370; 381/371; 381/71.6
(58) Field of Classification Search ......... 455/575.1, 455/575.2, 575.3, 575.4, 575.5, 575.6, 90.1–90.3; 379/430, 431, 433.02; 381/430, 371, 71.6, 381/370
See application file for complete search history.

(56) References Cited

U.S. PATENT DOCUMENTS

| | | | | |
|---|---|---|---|---|
| 5,113,428 A | * | 5/1992 | Fitzgerald | ................ 455/575.2 |
| 6,006,115 A | | 12/1999 | Wingate | |
| 6,775,390 B1 | * | 8/2004 | Schmidt et al. | ............. 381/371 |
| 2003/0007660 A1 | | 1/2003 | Tsunoda et al. | |
| 2003/0022703 A1 | | 1/2003 | Reshefsky | |
| 2003/0036362 A1 | * | 2/2003 | Buesseler et al. | ............. 455/90 |
| 2003/0048257 A1 | | 3/2003 | Mattila | |
| 2003/0083111 A1 | * | 5/2003 | Wu | ........................... 455/568 |
| 2003/0119543 A1 | | 6/2003 | Kfoury et al. | |
| 2004/0204207 A1 | * | 10/2004 | Parker | ..................... 455/575.2 |
| 2004/0219958 A1 | * | 11/2004 | Chenoweth et al. | ...... 455/575.7 |
| 2006/0013410 A1 | * | 1/2006 | Wurtz | ......................... 381/74 |

FOREIGN PATENT DOCUMENTS

| | | |
|---|---|---|
| EP | 1 301 011 A2 | 4/2003 |
| JP | 08-047075 | 2/1996 |
| JP | 2002-158753 | 5/2002 |

\* cited by examiner

*Primary Examiner*—Jean Gelin
*Assistant Examiner*—Khai Nguyen
(74) *Attorney, Agent, or Firm*—Straub & Pokotylo; Michael P. Straub

(57) ABSTRACT

An improved wireless communication device, method, and system, that is easy to operate for people of all ages, particularly for senior citizens, that is compact, ergonomic, and comfortable, but which also provides simplicity of operation for those users who do not require complex cellular telephone capabilities or features.

22 Claims, 13 Drawing Sheets

SYSTEMS AND METHODS FOR A COMFORTABLE WIRELESS COMMUNICATION DEVICE

BACKGROUND OF THE INVENTION

1. Field of the Invention

The field of the invention relates generally to wireless communication, and more particularly relates to a comfortable wireless communication device that provides simplicity and familiarity of operation.

2. Background Information

Wireless communication connects people of all ages on virtually every continent throughout the world through, for example, cellular telephones, paging units, wireless networking, and low-tier radio telephones. Since their introduction, cellular telephones in particular have helped the world overcome barriers of physical distance while providing a convenient method for communication. Cellular telephones offer convenience as a cellular telephone user can place a call from almost any location in the service area. As service areas expand, the convenience offered increases and the cost of wireless communication devices and services decreases.

Although cellular telephones have become less expensive to purchase and operate, they have proliferated in capabilities and features. A typical cellular telephone user seeks to take advantage of wireless communication while traveling, walking, or commuting. Thus, the modern cellular telephone design has been increasingly smaller and lighter to increase transportability of the device. Additionally, the features of the modern cellular telephone have developed to include, for example, calendars, personalized phone books, instant messaging capabilities, web browsing capabilities, and even digital camera capabilities. Though most of the features are accessible through the cellular telephone's display, the complexity of features and reduction in size of cellular telephones makes it cumbersome for many to program these features.

For example, a senior citizen may possess a cellular telephone for emergency use, to communicate with family members, or to defray the cost of long distance calls. A senior citizen may only desire to program the cellular telephone with a minimal number of telephone numbers, but the complexity required to program the cellular telephone and the decreasing size of the telephone can make it difficult to program these numbers. The small size of the keys combined with aging fine motor coordination may lead a senior citizen to struggle with the simple task of placing a call. Thus, although wireless communication has become more convenient to the average user, the operation of the cellular telephone itself has become too burdensome of an operation for the average senior citizen to endure.

Further, the smaller form factor of today's cellular telephones has reduced the size of the earpiece and speaker significantly. The reduced size of these components can make it difficult to interface the earpiece with the ear. It can be, for example, especially difficult for senior citizens to interface the earpiece with their ear; however, no one is necessarily immune to this difficulty.

BRIEF DESCRIPTIONS OF THE DRAWINGS

Preferred embodiments of the present inventions taught herein are illustrated by way of example, and not by way of limitation, in the Figures of the accompanying drawings, in which.

Figure 1:
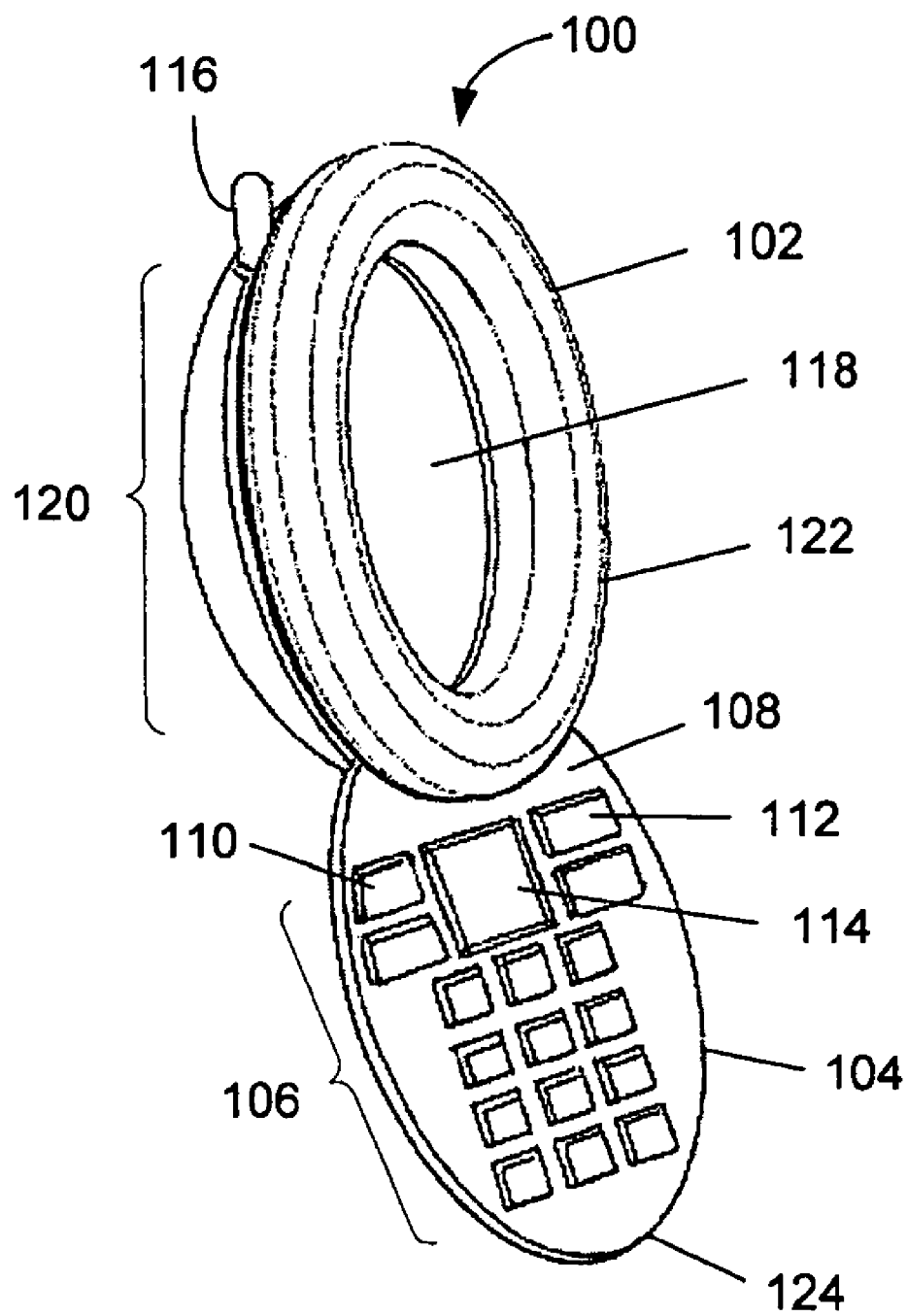
FIG. 1 is a diagram illustrating a cellular telephone with a hingedly connected keypad cover in accordance with one embodiment.
Figure 6:
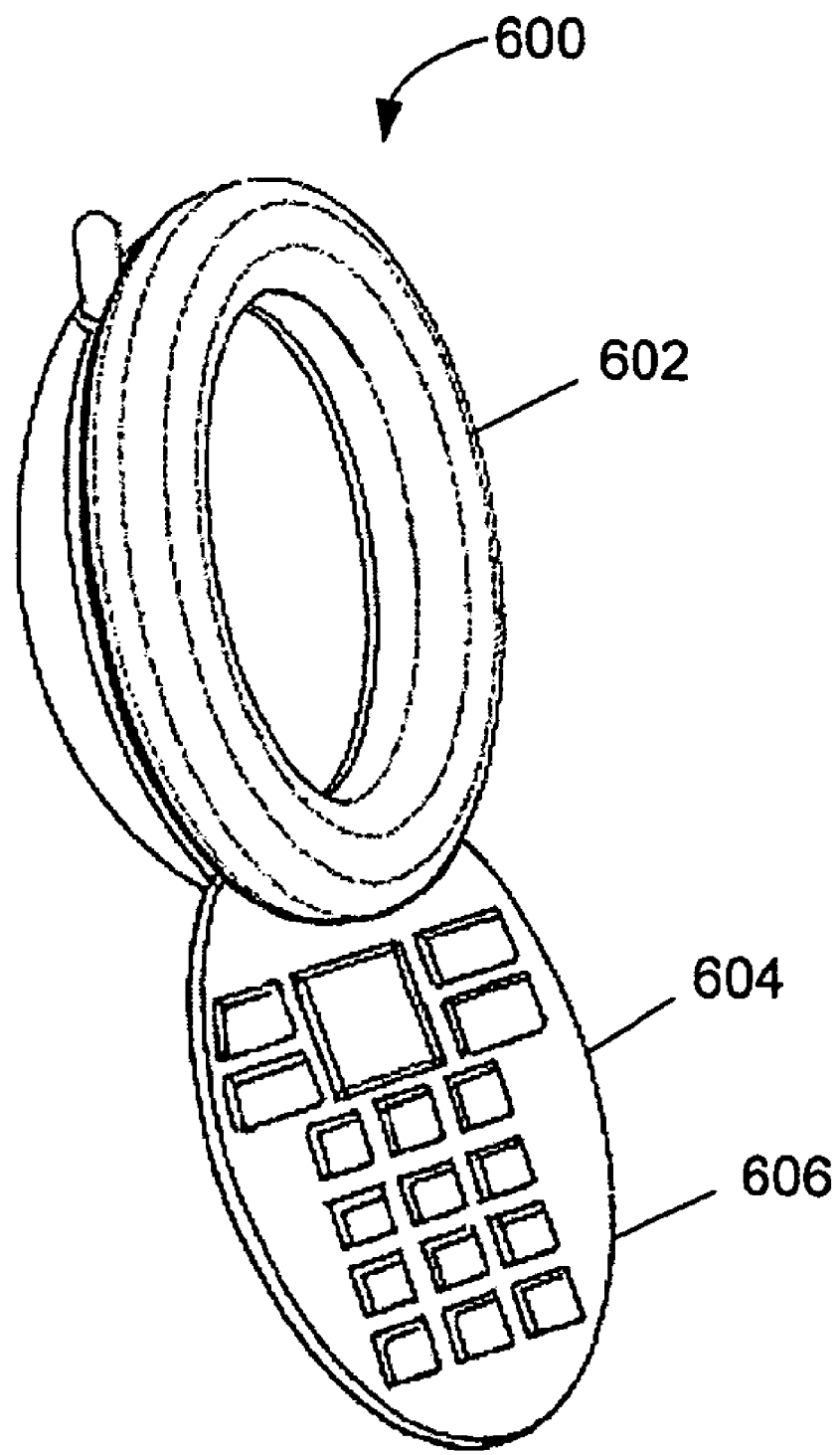
FIG. 6 is a diagram illustrating a cellular telephone with a pivotally connected keypad cover in accordance with another embodiment.
Figure 8:
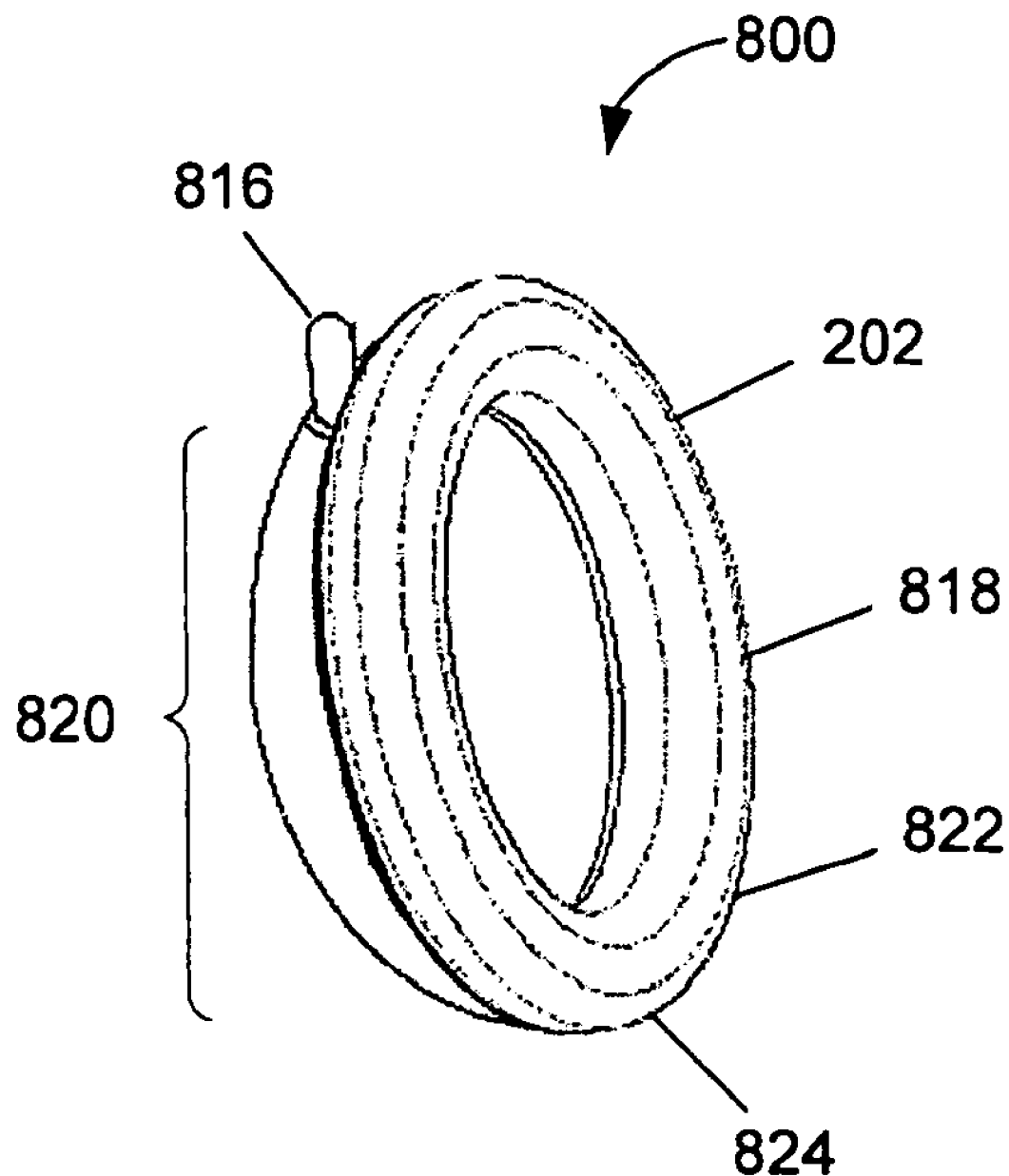
FIG. 8 is a diagram illustrating a cellular telephone with integrated display and function keys in accordance with still another embodiment.
Figure 12:
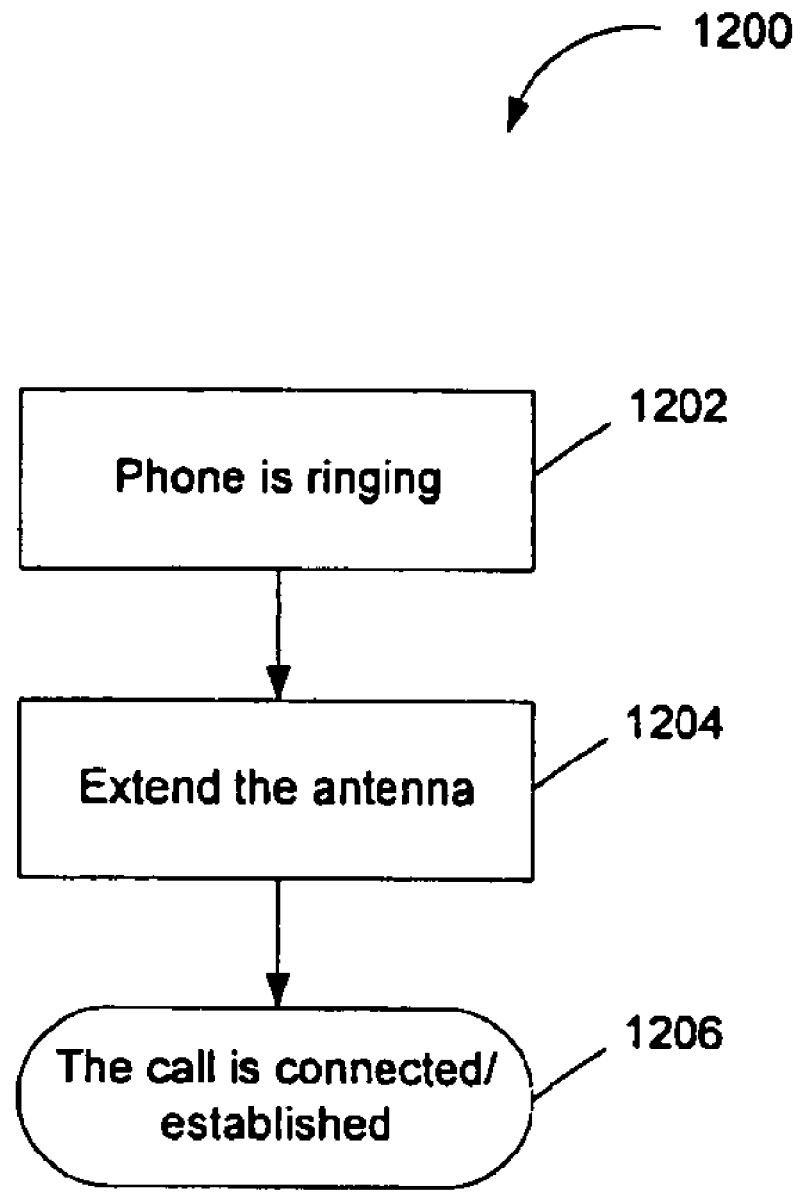
Figure 13:
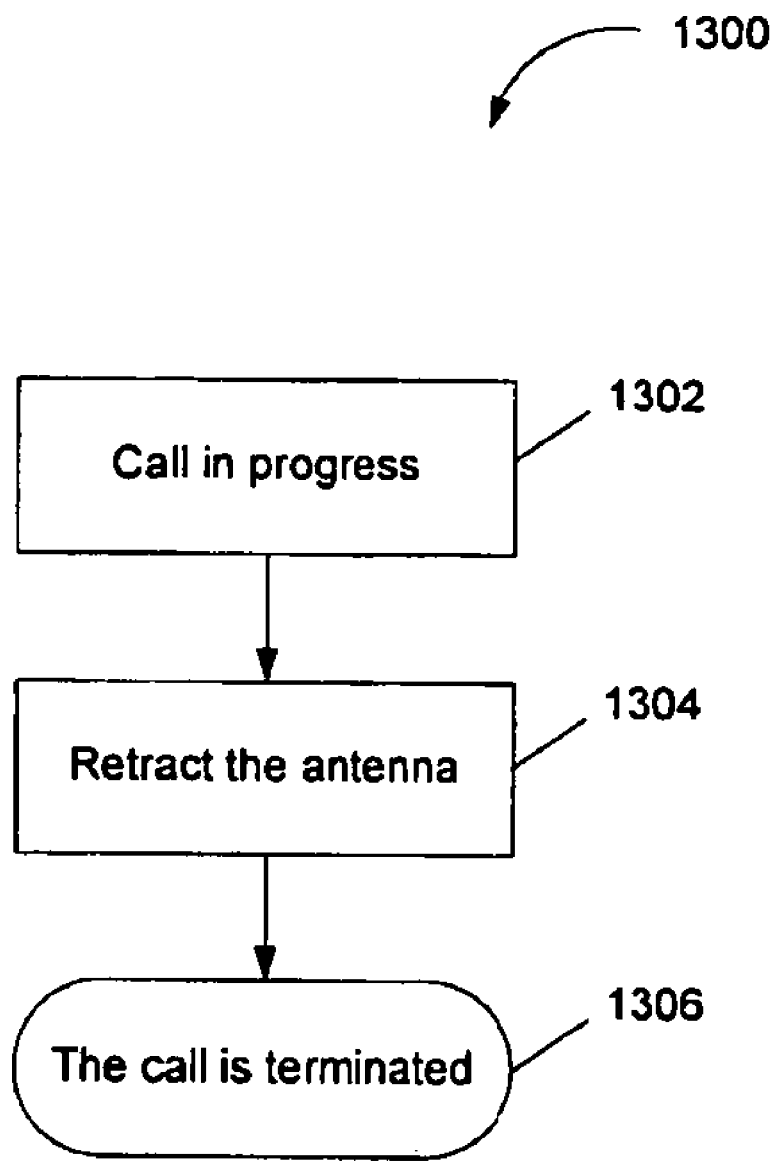

FIG. 12 is a flowchart that illustrates an example method by which the user of the wireless communication device configured in according to the embodiments of FIG. 1, 6, or 8 can answer a call; and FIG. 13 is a flowchart that illustrates an example method by which the user of the wireless communication device configured in according to the embodiments of FIG. 1, 6, or 8 can terminate or disconnect a call.

DETAILED DESCRIPTION OF THE PREFERRED EMBODIMENTS

In the descriptions of example embodiments that follow, implementation differences, or unique concerns, relating to different types of systems and methods described in terms of a cellular telephone will be pointed out to the extent possible. However, it should be apparent that the systems and methods described herein can be practiced without these specific details. Further, while the embodiments below are described in terms of a cellular telephone, it should be clear that the systems and methods described herein can be applied to any wireless communication device with audio capabilities.

FIG. 1 illustrates an external view of an exemplary cellular telephone 100 which includes earpiece 102 and keypad 106. In one embodiment, keypad 106 can comprise a faceplate 104 and display 108. Keypad 106 can, for example, be a standard 12-key alphanumeric keypad. Keypad 106 can also contain function keys 110, 112, and 114 including, but not limited to, a power key to turn cellular telephone 100 on and off, a send and disconnect button to connect or disconnect a call, and a two-aspect button that operates as a menu selector which can allow a user to scroll through menu items displayed on display 108 and make selections.

Figure 2:
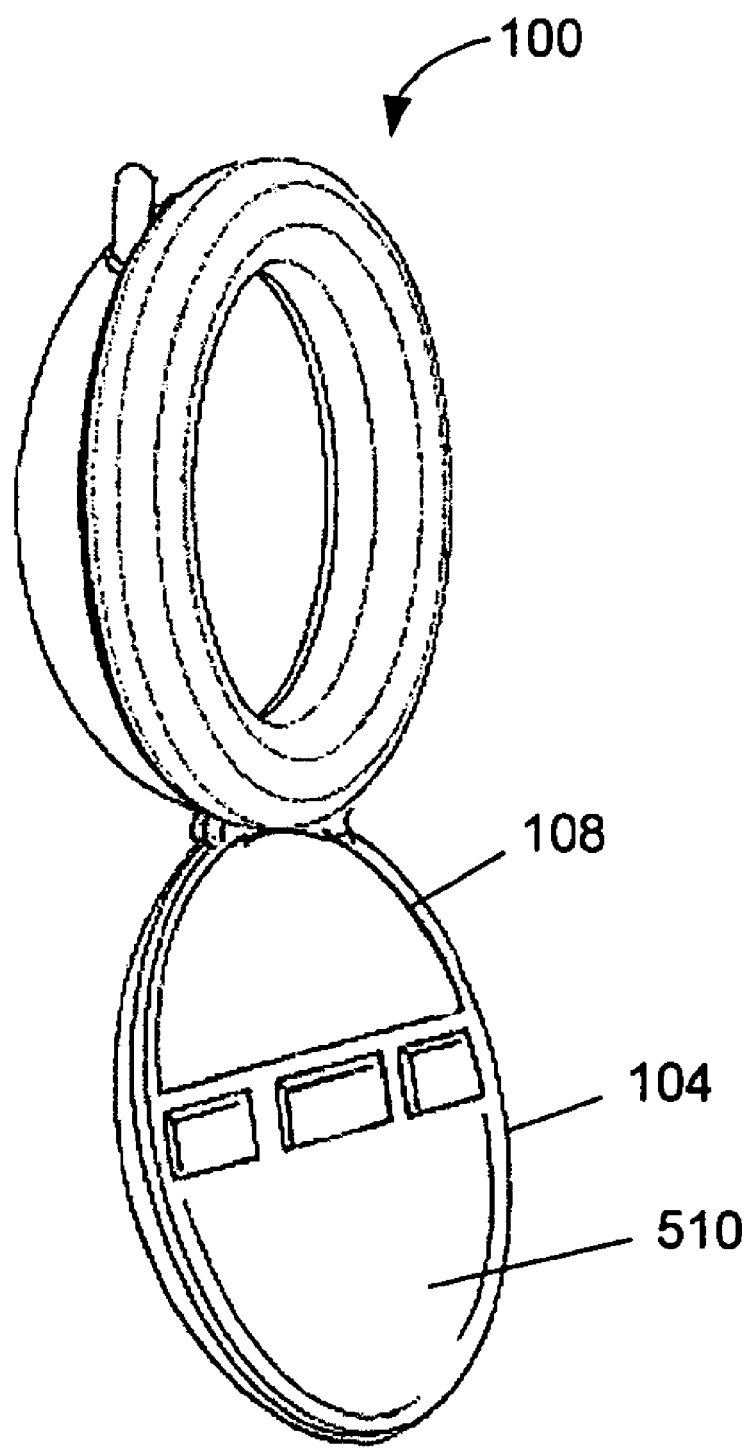
FIG. 2 is a diagram illustrating the cellular telephone of FIG. 1 with a different, removable faceplate installed over the keypad in accordance with another embodiment.

In alternative embodiments described below (see FIG. 2), a reduced set of keys can be included in keypad 106. For example, keypad 106 can include only function keys 110, 112, and 114, or the like. Thus, a cellular telephone configured in accordance with the systems and methods described herein can be configured for very basic use, wherein the user simply scrolls through a few preprogrammed numbers using a menu key and then hits send when the appropriate number is found to initiate a call. Similarly, the user can simply use the initiate key to answer an incoming call. A third key can be used to end a call. In one embodiment, the keys of keypad 106 can be five aspect buttons.

In another embodiment described below, a further reduced set of keys can be included in keypad 106. For example, keypad 106 can include a power key to turn cellular telephone 100 on and off without a send or end key. Following this embodiment, a user can answer and discontinue a call simply by extending and retracting antenna 116, or by opening or closing the moveable or slideable cover, or further by touching any key or button on cellular telephone 100.

By reducing the number of keys on keypad 106, the keys can be made extremely large and the functionality of cellular telephone 100 can be reduced significantly. This can be advantageous, for example, for use by senior citizens who do not need added functionality and can benefit the inclusion of larger keys that are easier to use and identify.

In alternative embodiments, the keys included in keypad 106 can be five aspect keys. By five aspect, it is meant that the key can be moved in five different direction to provide input into cellular telephone 100. For example, a five aspect key can be moved up, down, right, left, and depressed in the middle of the key to provide input. The aspects of the five aspect buttons can correspond to any numeral, alphabet letter, or character necessary for a menu item or function, including but not limited to data input, messaging, or DTMF control of an interactive voice system. For example, the second key of the standard 12-key alphanumeric keypad can perform five functions. The center aspect can correspond to the number "2", the left aspect can correspond to the letter "A", the up aspect can correspond to the letter "B", the right aspect can correspond to the letter "C", the down aspect can correspond to a character necessary for "data input."

In this manner, the entire alphabet can be associate with the various keys on keypad 106. Moreover, the five aspect keys can be made relatively large so that they are not only easy to identify, but easy to manipulate. This can make input of characters as well as the selection of numbers easy and intuitive. It should be apparent that keys with less aspects, e.g., 2, 3, or 4, can also be implemented with similar advantage.

Earpiece 102 may be larger than conventional earpieces. This has the effect of making cellular telephone 100 itself larger than conventional cellular telephones, but it also allows for a deep ear cavity and padded cushion 122 to be included in earpiece 102. Earpiece 102 can have an oval shape, a round shape, or any shape lending to the comfort of the user can be a domed shape. The domed shape can be configured such that it fits the natural contour of the user's hand.

In embodiments in which earpiece 102 has an oval, round, or domed shape, positioning of the phone to the user's ear will be intuitive leading to further user comfort and better audio. In one embodiment, the earpiece 102 can be insulated for noise reduction to reduce the amount of ambient, outside noise the user hears while conducting a call. Thus, earpiece 102 can be configured to act more like a stereo headphone, i.e., earpiece 102 can be configured to fit comfortably and easily over the ear of a user and to aid in coupling sound from a speaker 122 at the base of earpiece 102 to the ear of the user. Thus, while earpiece 102 may result in cellular telephone 100 being larger than conventional cellular telephones, it can also result in an enhanced user experience. This is because earpiece 102 can make cellular telephone 100 easier and more comfortable to interface with the user's ear, as well as aiding in improved audio performance.

Accordingly, earpiece 102 should be configured so that it fits comfortably over the ear of the user and can form a sufficiently sealed area around the user's ear via padding 122. Padding 122 can be made of any material, but should be relatively soft and pliable, and should also be capable of substantially maintaining its form over time. Padding 122 can have a wide cushion to maintain user comfort. Alternatively, padding 122 can be thin and light. Additionally, padding 122 can extend deep into the earpiece 102 so as to minimize any ear contact with any plastic, metal, or hard components within the earpiece 102. As padding 122 can become dirty or worn-out through ordinary use, padding 122 can be replaceable by the user. In one embodiment, for example, padding 122 can be replaced with a personalized padding specific to the user for personalization and fashion statements. Such personalization can include, but are not limited to, various styles and colors.

In another embodiment, a light pipe can be placed outside the diameter of the earpiece 102 next to the padding 122. The light pipe can produce a visible signal through the use of a pattern of lights that move through the light pipe to signal, i.e., a user that the cellular telephone 100 is ringing. Alternatively, the light pipe can be placed around the outside of display 108. In a further embodiment, the light pipe can be placed inside, or formed by, padding 122. For example padding 122 can be made of a clear, transparent material that permits light to visibly pass through.

In one embodiment, the volume a user hears in earpiece 102 can be added to the volume heard from the padding 122 to increase the overall volume heard by the user. Additionally, speaker 118 can be a hearing aid compatible speaker.

In one embodiment, the outer portion of earpiece 102 can be made of plastic. In another embodiment, the outer portion of earpiece 102 can be made of aluminum, titanium, or of various components made of aluminum, titanium, or plastic; however, earpiece 102 can be made of any other lightweight material suitable for the requirements of a cellular telephone. Like padding 122 above, the outer portion of earpiece 102 can become dirty, scratched, or worn out through ordinary use. As with padding 122, therefore, the outer portion of earpiece 102 can also be replaceable by the user. In one embodiment, the outer portion of earpiece 102 can be snapped into place by the user. Thus, the outer portion of earpiece 102 can be replaced with a personalized outer portion specific to the user for personalization and fashion statements. Such personalization can include, but are not limited to, various styles and colors.

As illustrated in FIG. 1, keypad 106 can be hingedly connected to earpiece 102 so as to fold in an upwardly direction to create a hinged cover over earpiece 102. In order to completely fold keypad 106 over earpiece 102, a cantilever hinge or double hinge or any other type of hinge with multiple hinges can be used to create a hinged cover. In some embodiments, the electronics to transmit data and sound can be incorporated into the fold of the hinges. The hinged cover can make cellular telephone 100 more compact while providing protection for the keypad 106 from inadvertent entries or damage.

In one embodiment, keypad 106 can be configured for use with a removable faceplate that can be attached and detached to keypad 106 to provide varying functionality. One example of a removable faceplate can be removable faceplate 410 of FIG. 4, which covers no keys of the keypad allowing a user access to the standard 12-key alphanumeric keypad, function keys 110, 112, and 114, and display 108 (see FIG. 1). If less functionality is required, however, then faceplate 410 can be replaced by removable faceplate 510 of FIG. 5, which covers the standard 12-key alphanumeric keypad allowing a user to access only function keys 110, 112, and 114 and display 108. Thus, faceplate 510 can be used to configured cellular telephone 100 in the manner illustrated in FIG. 2.

Figure 4:
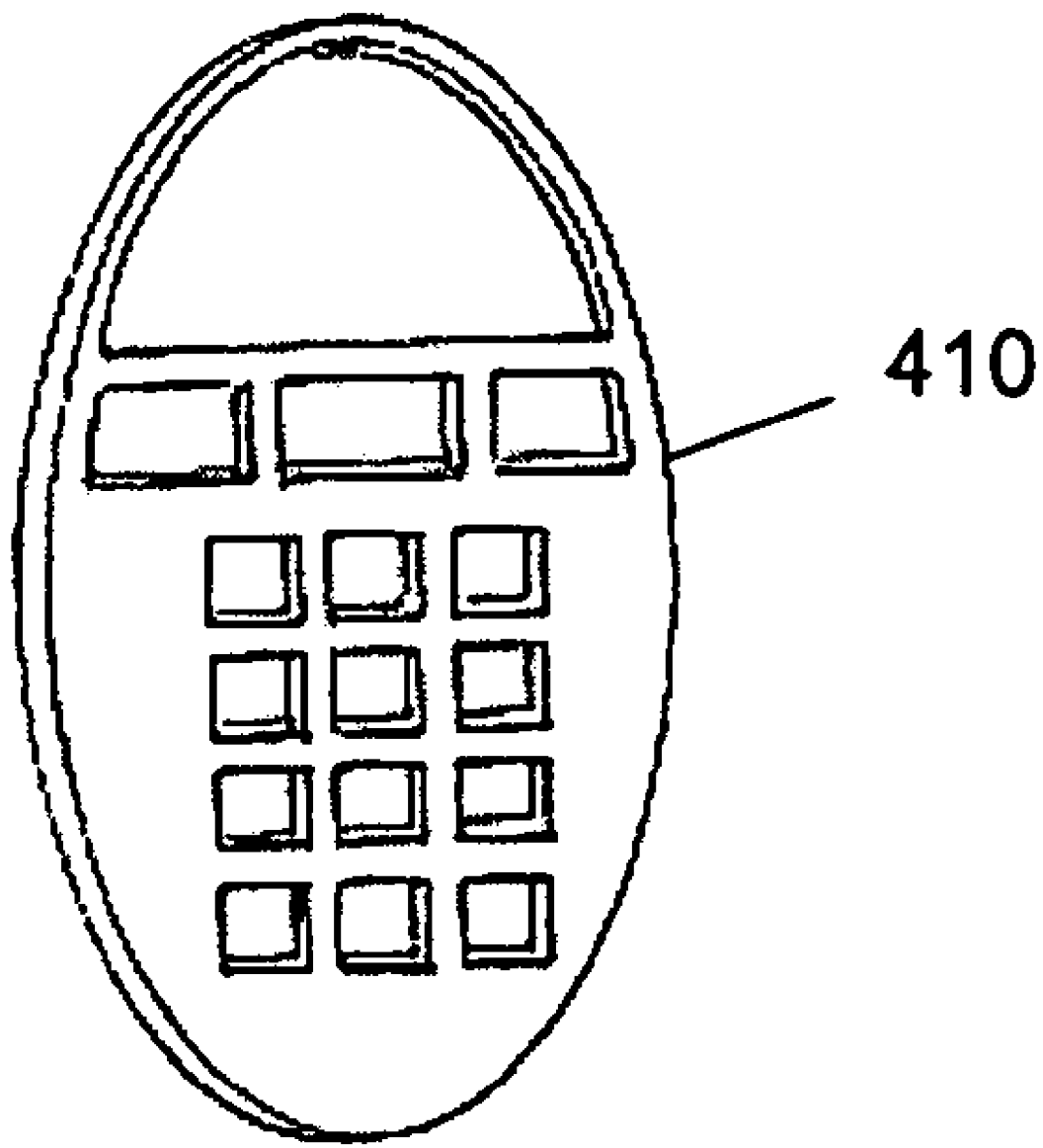
FIG. 4 is a diagram illustrating a removable faceplate exposing three function keys, a display, and a 12-key alphanumeric keypad in accordance with one embodiment.
Figure 5:
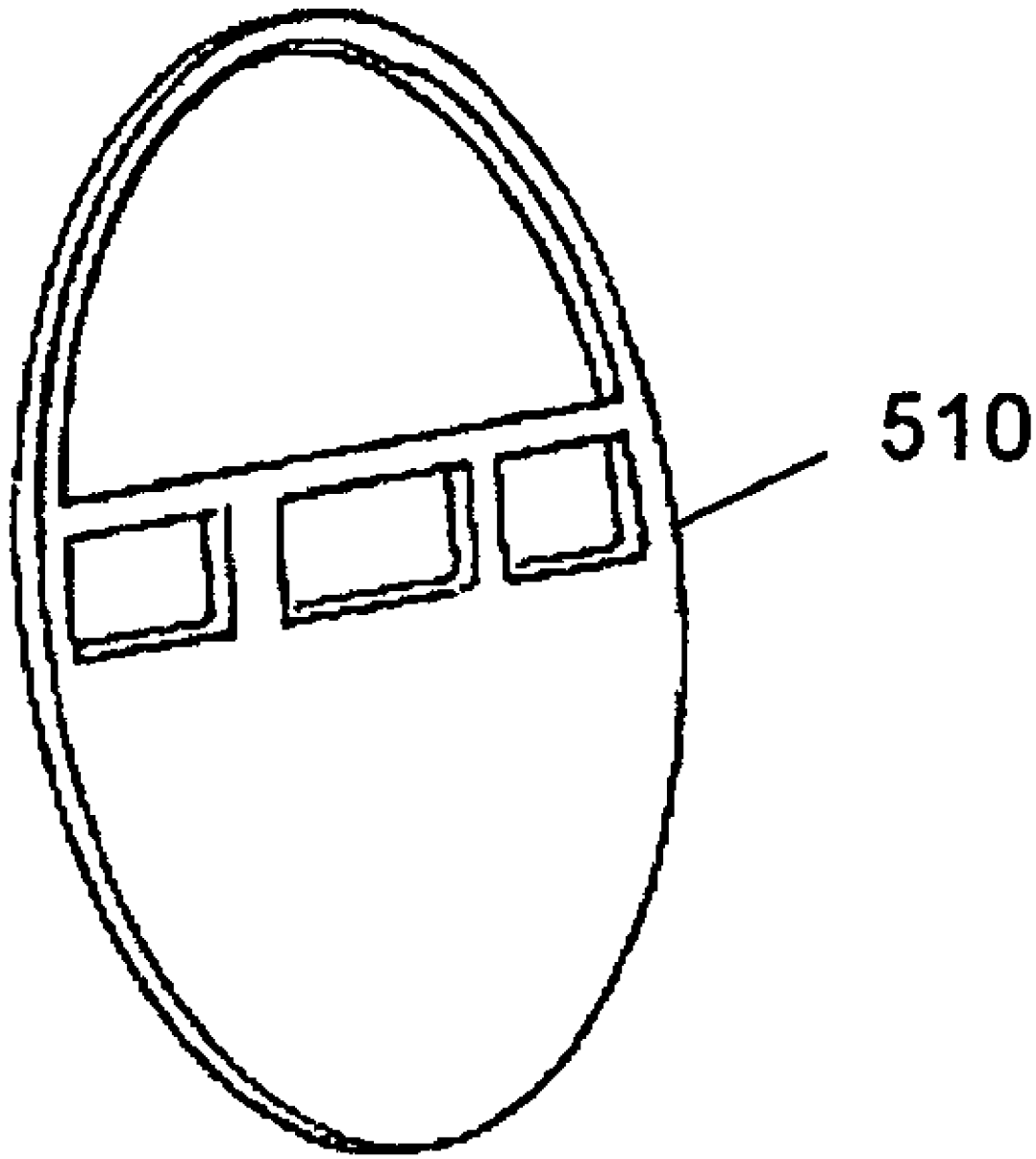
FIG. 5 is a diagram illustrating a removable faceplate exposing three function keys and display in accordance with another embodiment.

It will be clear that various configuration can be made possible via various removable faceplates, such as faceplates 410 and 510 illustrated in FIGS. 4 and 5, respectively. For example, in one embodiment, display 108 can be covered and in other embodiments, one or more of function keys 110, 112, and 114 can be covered, or some combination thereof.

In a further embodiment, the removable faceplate of keypad 106 can be user interchangeable. The user can replace the removable faceplate simply by snapping in and out various removable faceplates as discussed above. In some embodiment the removable faceplates can be plug and play compatible for easy provisioning by the internal electronics or other provisioning devices, such as those methods and apparatuses described in "Systems and Methods for Enhancing the Provisioning and Functionality of Wireless Instruments," U.S. patent application Ser. No. 60/547,569, filed Feb. 23, 2004.

Continuing with FIG. 1, earpiece 102 can also include an antenna 116. As is known, antenna 116 can transmit and receive wireless signals. In one embodiment, antenna 116 can move between a retracted position and an extended position as in many conventional cellular telephone designs. In another embodiment, however, the movement of antenna 116 from the retracted position to the extended position can operate as a "send" function to answer a call. Similarly, the movement of antenna 116 from the extended position to the retracted position can operate as an "end" function to terminate or disconnect a call. Thus, cellular telephone 100 can be made even easier to use by eliminating even the need to press keys to answer and end calls.

Further, extending antenna 116 can also be used to initiate a call to a predetermined number. For example, if cellular telephone is intended to be used only for emergencies, then cellular telephone can be configured so that extending antenna 116 can cause cellular telephone to place a call to a predetermined number such as 911, or a relatives or emergency contacts number.

In order to prevent placing unintended calls, cellular telephone 100 can be configured such that a relatively significant force is required to extend antenna 116, and/or a latching mechanism can be included to latch/hold antenna 116 in the retracted position until unlatched. Further, cellular telephone 100 can be configured such that a clicking sound can be heard when the antenna 116 is fully extended and concurrently placing a call to make the user aware that a call is being placed.

In an alternative embodiment, antenna 116 can be integrated into the body of cellular telephone 100. Thus, antenna 116 would not be visible to the user.

In certain embodiments, a plunger-type button can be located at the top of cellular telephone 100 for ease of operation with a user's elongated index finger. The plunger type button can control the volume of the ringer and speaker. For example, during a call a user can depress the plunger-type button until a desired speaker volume level is achieved. While not in a call, a user can depress the same plunger-type button until a desired ringer volume level is achieved. The user can also select an alert ringer mode for silent vibration using this same plunger type button, while the user is not engaged in a call.

In certain embodiments, display 108 can be located on keypad cover 104 just above keypad 106 as depicted in FIG. 1. In one embodiment, display 108 can show telephone numbers entered on keypad 106, corresponding names, and menu items corresponding to the programming of the cellular telephone 100. In another embodiment, the display area of display 108 can comprise a character size that is large enough that only the telephone numbers entered can be displayed. In yet another embodiment, display 108 can provide backlighting sufficient to light the text displayed on display 108.

In further embodiments, display 108 can be placed within earpiece 102 so as to reduce the amount of glare seen by the user on display 108. The glare reduction can increase the user's visibility of any information displayed on the display 108.

Alternatively, display 108, as well as keypad 106 can be integrated into earpiece 102 as described to some extent below. But since earpiece 102 is larger than conventional cellular telephone designs, increased functionality can be incorporated into earpiece 102 itself.

FIG. 1 can further include a microphone 124. In one embodiment, microphone 124 can be attached to the end or bottom of keypad cover 104. Thus, the microphone 124 can be placed on keypad cover 104 to be near the mouth of the user when the ear of the user is placed in the earpiece 102 near speaker 118.

In one embodiment, control circuitry (not shown in FIG. 1) in earpiece 102 can control the operation of the cellular telephone 100. The control circuitry can connect to the cellular transceiver/receiver (also not shown) to control the transmission and reception of cellular signals. The control circuitry likewise can connect to antenna 116 to provide for communication between the cellular telephone 100 and a cellular transmission and reception tower. The control circuitry can be connected to the speaker 118 to project sound. The control circuitry can also be connected to the keypad 106 allowing a user to input data. The display 108 can also be coupled to the control circuitry to display data entered by the user from the keypad 106 in addition to any display from programming held in the memory of the cellular telephone 100 including selectable menus. The control circuitry can also be connected to a microphone 124 allowing a user to input sound to be transmitted to a cellular transmission and reception tower.

Figure 3:
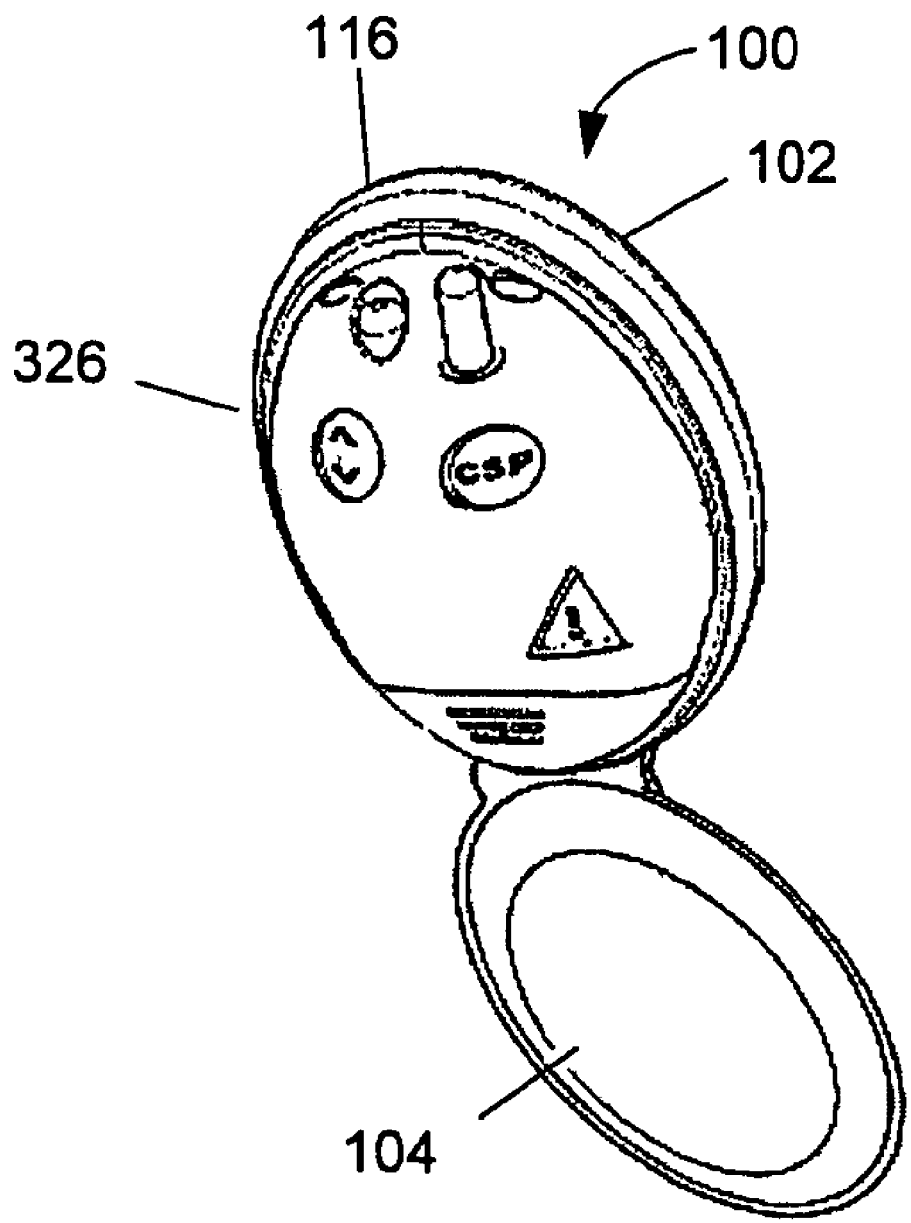
FIG. 3 is a diagram illustrating a rear angle of the cellular telephone of FIG. 1.

FIG. 3 shows a rear angle of the external view of cellular telephone 100, which includes earpiece 102 and keypad 106 and antenna 116. In one embodiment, power source 326 can ergonomically fit within earpiece 102. In certain embodiments, power source 326 can be a rechargeable battery to power cellular telephone 100. In another embodiment, power source 326 can fit under keypad 106; however, it will be understood that batteries are relatively large and would make keypad 106 more bulky than required. Since earpiece 102 is already large, it can be preferable to incorporate power source 326 into earpiece 102. Moreover, since earpiece 102 is large, a larger power source 326, e.g., battery or multiple batteries, can be included without increasing the size of earpiece 102. Thus, longer talk and standby times can be achieved without incurring any additionally size requirements.

In a further embodiment, a small amount of energy stored in power source 326 can be reserved for emergency use. In one embodiment, power source 326 will have a resident battery life of between one and three or more years. In order to reserve power for emergency use, a radiofrequency (RF) signal can be transmitted to the power source 326 to signal the cellular telephone 100 to turn off or switch power sources to a secondary power source. The RF signal can be generated by various methods of sensing techniques, known by those of ordinary sill in the art. Thus, cellular telephone 100 can have enough power in power source 326 to allow one emergency telephone call which could be directly dialed into a carrier call center or emergency service center such as 911.

FIG. 6 illustrates an external view of an exemplary cellular telephone 600 which includes earpiece 602, similar to earpiece 102, and keypad 604. In one embodiment, cellular telephone 600 can encompass the features of cellular telephone 100 with the exception that keypad 604 is not hingedly connected to the earpiece 602 so as to fold in an upwardly direction to create a hinged cover over the earpiece 602. Instead, keypad 604 can be pivotally connected to the earpiece 602 so as to pivot in a horizontally sliding direction to place keypad 604 on the back of earpiece 602. The pivotally connected keypad 604 can make cellular telephone 600 more compact while providing protection for the keypad 604 from inadvertent entries and damage.

Keypad 604 can also be configured for use with removable face plates 606 as described above.

Figure 7:
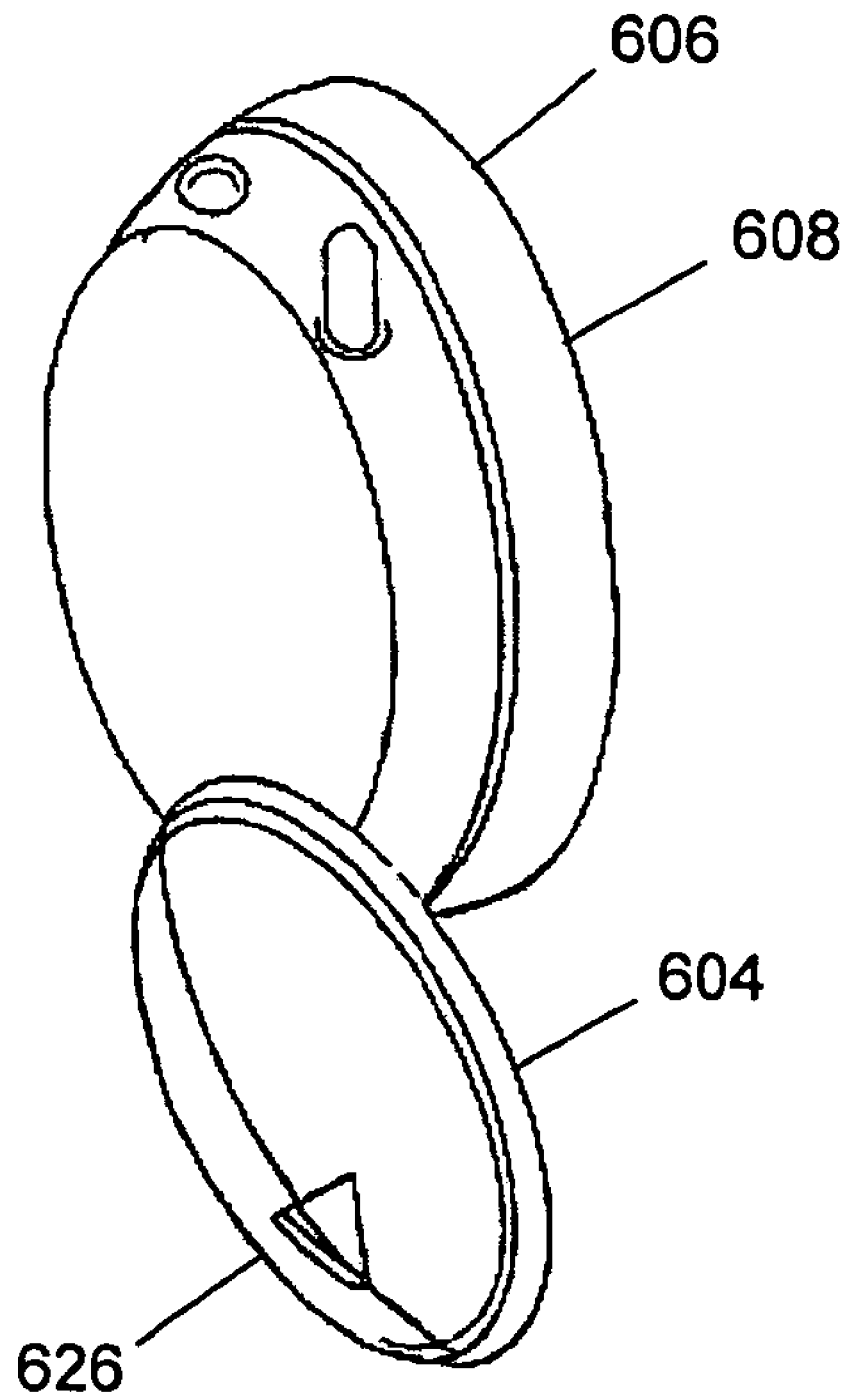
FIG. 7 is a diagram illustrating a rear angle of the cellular telephone of FIG. 6.

FIG. 7 shows a rear angle of the external view of cellular telephone 600, which includes earpiece 602, keypad 604, and antenna 616. In one embodiment, power source 626 can ergonomically fit within earpiece 602 as described above. In another embodiment, power source 626 can ergonomically fit within keypad 604.

In a further embodiment, the keypad 604 of cellular telephone 600 can be located on a keypad cover that slides in and out of cellular telephone 600. The keypad cover, when pushed in, can make cellular telephone 600 more compact while providing protection for the keypad 604 from inadvertent entries and damage. The keypad cover, when pulled out, can make the keypad 604 accessible to the user. In some embodiments, as the keypad cover is extended, a call can be connected to a preprogrammed number or to answer a call. As the keypad cover is closed, a call can be terminated or disconnected. Thus, cellular telephone 600 can be made even easier to use by eliminating the need to press keys and to answer and end calls.

Keypad 604 can be configured for use with removable face plates 606 as described above.

In the embodiment of FIG. 8, cellular telephone 800 can comprise and earpiece 802, similar top those described above; however, the keypad functionality is incorporated within earpiece 802. This can be illustrated by the view of FIG. 9, which illustrates that various keys and display 908 are incorporated directly into earpiece 802.

Accordingly, earpiece 800 can comprise a speaker 818 and padding 822 as well as a microphone 824. In one embodiment, microphone 824 can be attached to the end or bottom of earpiece 802. Microphone 824 can be a unidirectional microphone positioned toward the user's mouth to receive the user's voice. In a further embodiment, a noise canceling microphone can be used to eliminate any background noise while providing a clear voice transmission. In still another embodiment, a boom microphone can be used where a boom extends from the lower portion of earpiece 802.

In embodiments with a boom microphone extending from the lower portion of earpiece 802, the movement of the boom microphone from the retracted position to the extended position can operate as a "send" function or to answer a call. Similarly, the movement of the boom microphone from the extended position to the retracted position can operate as an "end" function to terminate or disconnect a call. Thus, cellular telephone 100 can be made even easier to use by eliminating the need to press keys and to answer and end calls.

Further, extending boom microphone can also be used to initiate a call to a predetermined number. For example, if cellular telephone is intended to be used only for emergencies, then cellular telephone can be configured so that the boom microphone can cause cellular telephone to place a call to a predetermined number such as 911, or a relatives or emergency contacts number.

In order to prevent placing unintended calls, cellular telephone 100 can be configured such that a relatively significant force is required to extend a boom microphone, and/or a latching mechanism can be included to latch/hold the boom microphone in the retracted position until unlatched. Further, cellular telephone 100 can be configured such that a clicking sound can be heard when the boom microphone is fully extended and concurrently placing a call to make the user aware that a call is being placed.

Figure 9:
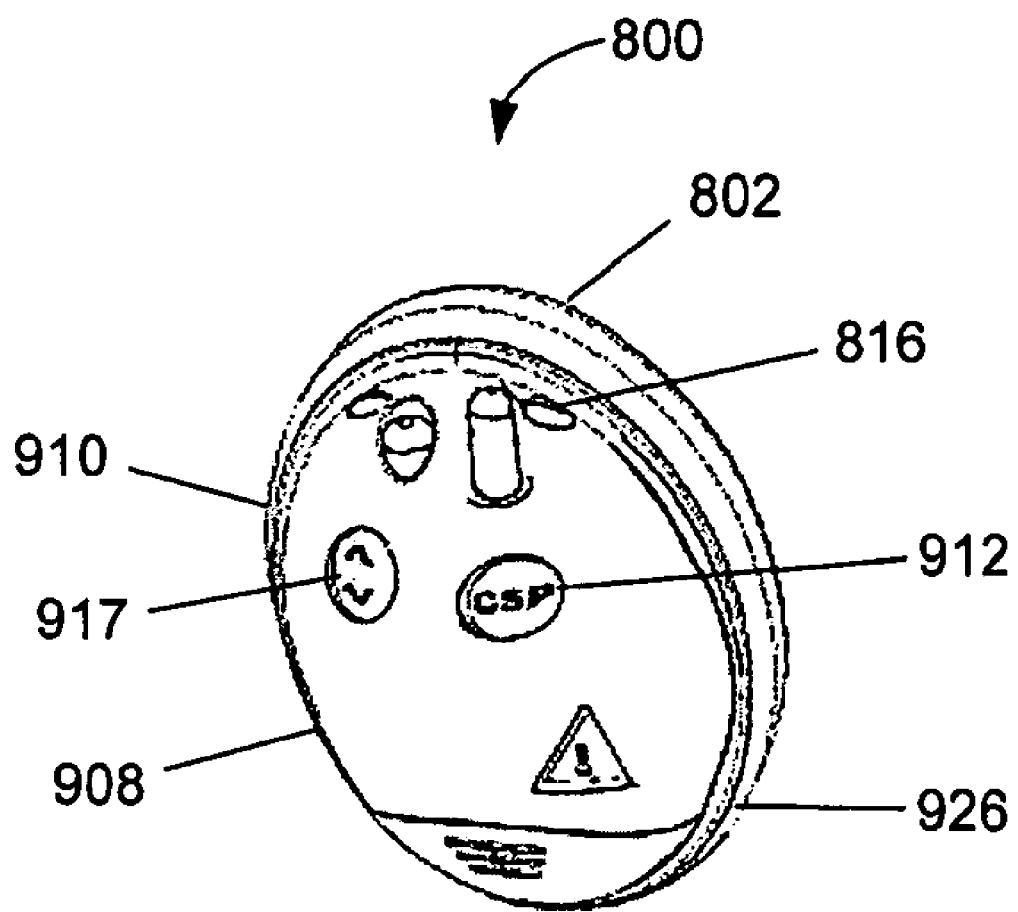
FIG. 9 is a diagram illustrating a rear angle of the cellular telephone of FIG. 8.

FIG. 9 shows that in one embodiment earpiece 802 can also include an antenna 816, which can be used to initiate and end calls as described above. FIG. 9 shows a rear angle of the external view of cellular telephone 800 which can include the features described in FIG. 8 and illustrates a display 908, function keys 910, 912, and 914, and power source 926.

In certain embodiments, display 908 can be located on the back closing of earpiece 802 as depicted in FIG. 9. In other embodiments, display 908 can, for example, be placed within earpiece 802 near speaker 818. Alternative positions for display 908 are clearly possible as well. In one embodiment, display. 908 can show telephone numbers, corresponding names, and menu items corresponding to the programming of the cellular telephone 100. In another embodiment, display 908 can have a large enough character size to display only the telephone numbers entered. In yet another embodiment, display 908 can provide backlighting sufficient to light the text displayed on display 908.

In one embodiment, function keys 910, 912, and 914 can be located on the back closing of telephone body 802 as depicted in FIG. 9. Function keys 910, 912, and 914 can include, but is not limited to, a power key to turn cellular telephone 100 on and off, a send and disconnect button to connect or disconnect a call, and a two-aspect button that acts as a menu selector which allows a user to scroll through menu items displayed on display 908 and make selections. Function keys 910, 912, and 914 can be positioned in any location or order on the back closing of telephone body 802.

In one embodiment, the function keys 910, 912, and 914 can be five aspect buttons. The five aspect buttons can move up, down, left, right, and center to select corresponding applications. The aspects of the five aspect buttons can correspond to any numeral, alphabet letter, or character necessary for a menu item or function, including but not limited to data input, messaging, or DTMF control of an interactive voice system. For example, the second key of the standard 12-key alphanumeric keypad can perform five functions. The center aspect can correspond to the number "2", the left aspect can correspond to the letter "A", the up aspect can correspond to the letter "B", the right aspect can correspond to the letter "C", the down aspect can correspond to a character necessary for "data input."

In a further embodiment, power source 926 can ergonomically fit within telephone body 802. In certain embodiments, power source can be a rechargeable battery to power cellular telephone 900.

Figure 10:
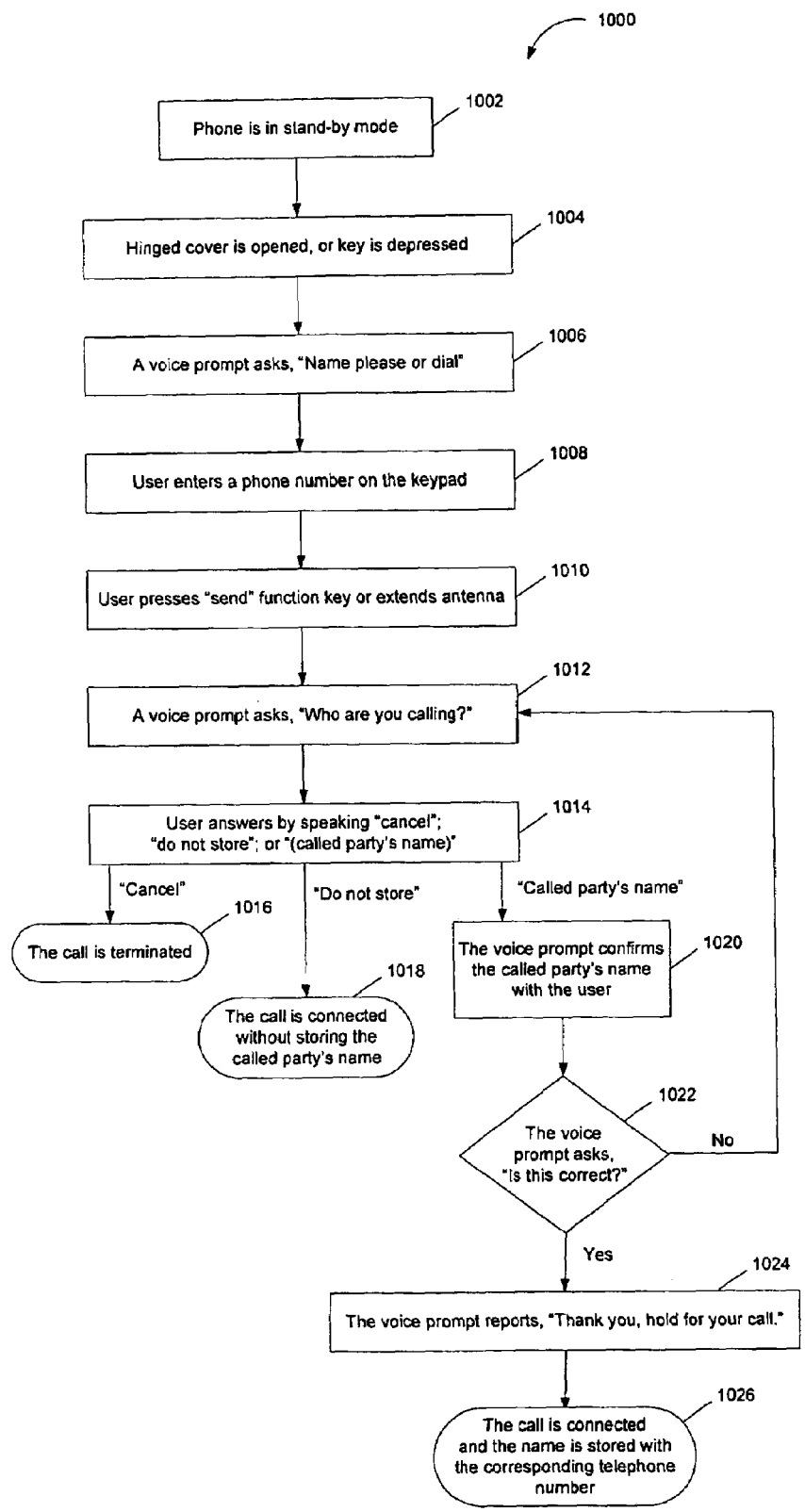
FIG. 10 is a flowchart that illustrates an example method by which a wireless communication device configured in according to the embodiments of FIG. 1, 6, or 8 can be programmed by the user.

In order to further enhance the user experience, a cellular telephone configured according to the systems and methods described herein can be programmed to receive voice commands and issue audible requests or instructions. FIG. 10 for example, is a flowchart illustrating an example method for programming a cellular telephone in accordance with the systems and methods described herein. Initially, in step 1002, a cellular telephone is in standby. In step 1004, a user can open the hinged cover or depresses a key. A voice prompt asks "Name please, or dial a number," as depicted in step 1006. A user can enter a phone number on the keypad that the user wishes to call as shown in step 1008. In step 1010, a user can press the "send" function key or extends the antenna to-dial the phone number. A voice prompt then asks, "Who are you calling?" as shown in step 1012. Step 1014 illustrates that the user can answer by speaking "cancel", "do not store", or the called party's name. If the user says "cancel", the call is terminated as shown in step 1016. If the user says "do not store", the call is connected without storing the called party's name as shown in step 1018. If the user says the called party's name, the voice prompt confirms the called party's name with the user as illustrated in step 1020. In step 1022, the voice prompt confirms the called party's name by asking the user, "Is this correct?" If the user answers "No" the user returns to step 1012. If the user answers "Yes", the voice prompt reports, "Thank you, hold for your call," as depicted in step 1024. In step 1026, the call can then be connected and the name of the called party can be stored with the corresponding telephone number in the memory of the cellular telephone.

Figure 11:
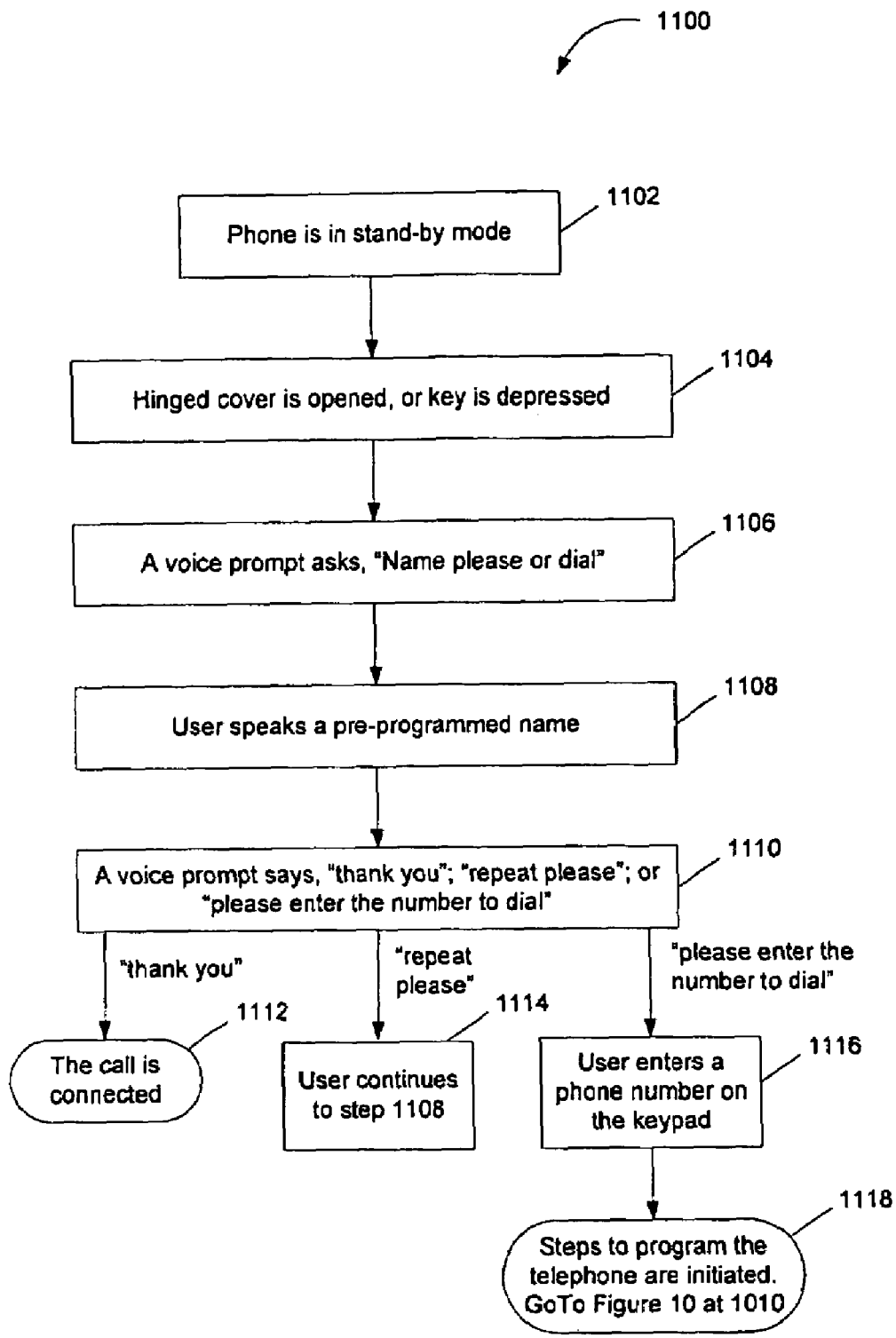
FIG. 11 is a flowchart that illustrates an example method by which the user of the wireless communication device configured in according to the embodiments of FIG. 1, 6, or 8 can place a call.

FIG. 11 is a flowchart illustrating an example method for placing a call on cellular telephone in accordance with one embodiment of the systems and methods disclosed herein. Initially, in step 1102, a cellular telephone is in standby. In step 1104, the user can open the hinged cover or depresses a key. A voice prompt asks "Name please, or dial a number," as depicted in step 1106. In step 1108, the user can speak a pre-programmed name according to the programming method shown in FIG. 10. In step 1110, a voice prompt says either "Thank you", "Repeat, please", or "Please enter the number to dial." If the voice prompt says "Thank you", the call is connected as shown in step 1112. If the voice prompt says "Repeat, please", the user returns to step 1108 and again speaks a pre-programmed name as shown in step 1114. If the voice prompt says, "Please enter the number to dial", the user enters a phone number on the keypad as shown in step 1116. In step 1118, the programming then can direct the user to step 1010 of FIG. 10 to program the telephone with the corresponding name.

FIG. 12 is a flowchart illustrating an example method for answering a call on a cellular telephone in accordance with one embodiment of the system and methods disclosed herein. In step 1202, the cellular phone can ring to alert a user of an incoming call. To answer the call, a user can extend the antenna as shown in step 1204. Then, in step 1206, the call can be connected and the conversation can commence between a caller and a user.

FIG. 13 is a flowchart illustrating an example method for terminating a call on a cellular telephone in accordance with one embodiment of the systems and methods disclosed herein. In step 1302, the call can be connected and in progress between a caller and a user. After the user or the caller decides to end the call in progress, the user can retract the antenna as shown in step 1304. The call can then be terminated as shown in step 1306.

In another embodiment, a cellular telephone can present a dial tone to a user to inform a user that the cellular telephone is ready for dialing. Some users can be confused by the operation of a telephone without a dial tone and requiring the use of a "send" key. With a dial tone present, there can be no need for a "send" key as calls can be dialed immediately following entry of the last telephone number digit.

Further, in one embodiment, the cellular telephone can be programmed with voice recognition software. The cellular telephone can be programmed with DTMF controls to operate the embodiments of the device, system or method disclosed herein.

Further, in another embodiment, the cellular telephone can incorporate a playback device for playing stored musical files such as MP3 files or WAV files. In one embodiment, the cellular phone with incorporated MP3 player can be housed in an earphone style headset. Some features of this embodiment can include downloading the MP3 files, instructions, voice messages, and voice reminders through either connection to the internet directly, connection to provisioning software such as through the methods and apparatuses as disclosed in "Systems and Methods for Enhancing the Provisioning and Functionality of Wireless Instruments," U.S. patent application Ser. No. 60/547,569, filed Feb. 23, 2004, or through the cellular telephone itself including downloading musical files over radiofrequency waves acting in a similar for to that of a radio. In another embodiment, the integrated MP3 player of cellular telephone 100 automatically reduces the volume when the cellular telephone rings. Thus, when the cellular telephone rings, the volume of the MP3 player mutes and the user can hear the ring and answer the call.

In another embodiment, the cellular telephone 100 can include a digital camera and, alternatively, video technologies to record movie pictures with sound. In a further embodiment, the cellular telephone 100 can include software to connect to the internet directly to enable a user to browse internet web pages from the display of the phone.

In a further embodiment, cellular telephone 100 can connect to a battery charging unit, provisioning equipment, or docking station through induction methods. Thus, the battery can recharge and the software can update without plugging a connector directly into the phone.

In a still further embodiment, earpiece 102 can be adapted to allow any style of cellular telephone to connect to the earpiece housing so as to transform the conventional cellular telephone speaker into the comfortable earpiece version as described above. For example, a conventional "candy bar" cellular telephone can slide into the back portion of a earpiece housing and electronically connect to the earpiece through connector points. The sound sent to the conventional cellular telephone speaker can be routed to the speaker of the comfortable earpiece. Thus, the user can take advantage of the noise reduction comfort without purchasing a new cellular telephone.

While embodiments and implementations of the invention have been shown and described, it should be apparent that many more embodiments and implementations are within the scope of the invention. Accordingly, the invention is not to be restricted, except in light of the claims and their equivalents.

What is claimed is:

1. A wireless communication device, comprising:
   an earpiece, the earpiece comprising a deep ear cavity having a front opening for placement adjacent to an ear of a user;
   a speaker positioned inside the deep ear cavity; and
   a padded cushion configured to fit around the front opening of the deep ear cavity and to conform comfortably around the ear of the user;
   a keypad permanently movably attached to said earpiece, said movably attached keypad being movable from a closed position in which keys on said keypad are covered by said earpiece and inaccessible to the user and an open position in which said keys are accessible; and
   wherein said wireless communications device is a handheld unit.

2. The wireless communication device of claim 1, wherein said earpiece is oval shaped; and
   wherein said earpiece is lager than a keypad mounting portion of said communications device in which the keypad is mounted, said padded cushion extending at least partially beyond the keypad mounting portion when said keypad is in the closed position.

3. The wireless communication device of claim 1, wherein said earpiece is domed shaped.

4. The wireless communication device of claim 1, wherein said earpiece is round shaped.

5. The wireless communication device of claim 1, wherein the size of the earpiece is configured such that it will fit comfortable over the ear of most users.

6. The wireless communication device of claim 1, further comprising:
   a display, and
   wherein said keypad and said display are mounted on a back closed portion of said earpiece.

7. The wireless communication device of claim 1, wherein the padded cushion is interchangeable.

8. The wireless communication device of claim 1, wherein the shape of the earpiece is configured to aid in coupling sound from the speaker to an ear of a user.

9. The wireless communication device of claim 1, further comprising a keypad.

10. The wireless communication device of claim 9, wherein the keypad comprises three large keys including a two aspect key for selecting display items, a power key, and a CSP key.

11. The wireless communication device of claim 9, wherein the keypad is mounted via a hinge to the earpiece in a manner that allows the keypad to flip up and cover the deep ear cavity portion of the earpiece when not in use.

12. The wireless communication device of claim 9, wherein the keypad is mounted on an inside of a movable cover coupled to at least one point of said earpiece, and wherein the movable cover is configured to swivel over said deep ear cavity when not in use.

13. The wireless communication device of claim 9, wherein the keypad comprises a plurality of five aspect buttons.

14. The wireless communication device of claim 1, wherein the keypad is mounted on a keypad cover that is slideably coupled to the earpiece.

15. The wireless communication device of claim 1, wherein the keypad is an interchangeable keypad.

16. The wireless communication device of claim 1, further comprising an antenna configured to send and receive wireless signals.

17. The wireless communication device of claim 16, wherein the antenna is configured to move between a first retracted position and a second extended position.

18. The wireless communication device of claim 17, wherein the antenna operates to establish a call when moved into said second extended position from said first retracted position.

19. The wireless communication device of claim 17, wherein said antenna operates to terminate a call when moved into said first retracted position from said second extended position.

20. The wireless communication device of claim 17, wherein movement of the antenna between a first retracted position and a second extended position requires movement over a holding mechanism so as to prevent accidental extension and subsequent dialing.

21. The wireless communication device of claim 20, wherein the holding mechanism makes a clicking sound when the antenna is moved into the second extended position.

22. The wireless communication device of claim 1, further comprising voice recognition capabilities wherein telephone numbers and corresponding names can be dialed spoken commands.

* * * * *